(12) United States Patent
Hehenberger et al.

(10) Patent No.: US 10,641,346 B2
(45) Date of Patent: May 5, 2020

(54) CLUTCH ARRANGEMENT FOR A DRIVE TRAIN OF A MOTOR VEHICLE

(71) Applicant: Magna Powertrain GmbH & Co KG, Lannach (AT)

(72) Inventors: Alexander Hehenberger, Premstaetten (AT); Kurt Kippes, Weiz (AT); Alexander Klar, Graz (AT); Wolfgang Schweiger, St. Stefan (AT)

(73) Assignee: Magna Powertrain GmbH & Co KG, Lannach (AT)

( * ) Notice: Subject to any disclaimer, the term of this patent is extended or adjusted under 35 U.S.C. 154(b) by 186 days.

(21) Appl. No.: 15/887,016

(22) Filed: Feb. 2, 2018

(65) Prior Publication Data
US 2018/0231070 A1 Aug. 16, 2018

(30) Foreign Application Priority Data

Feb. 13, 2017 (DE) ...................... 10 2017 202 248.5

(51) Int. Cl.
*F16D 23/14* (2006.01)
*F16D 11/14* (2006.01)
(Continued)

(52) U.S. Cl.
CPC .............. *F16D 23/14* (2013.01); *F16D 11/14* (2013.01); *F16H 25/186* (2013.01); *F16H 63/30* (2013.01); *F16D 2011/002* (2013.01); *F16D 2011/006* (2013.01); *F16D 2023/123* (2013.01); *F16H 2063/305* (2013.01); *F16H 2063/3056* (2013.01); *F16H 2063/3093* (2013.01); *Y02T 10/56* (2013.01)

(58) Field of Classification Search
None
See application file for complete search history.

(56) References Cited

U.S. PATENT DOCUMENTS 4,736,643 A 4/1988 Richards
8,919,515 B2 12/2014 Granzow et al.
(Continued)

FOREIGN PATENT DOCUMENTS

DE 102010048739 A1 4/2012
DE 102011085839 A1 5/2013
FR 78856 E 9/1962

OTHER PUBLICATIONS

Search Report dated Mar. 15, 2019 from corresponding Chinese patent application No. 2018101465095.

*Primary Examiner* — Timothy Hannon
(74) *Attorney, Agent, or Firm* — Dickinson Wright PLLC

(57) ABSTRACT

A clutch arrangement for a drive train of a motor vehicle comprising a switching element with a control geometry, an actuator, an actuating element, and a running roller. The switching element is arranged on an output element such that it is fixed in terms of rotation but can be moved axially into a first switching position and into a second switching position, an actuator operable for movement of the switching element from the first switching position into the second switching position and/or vice versa. The actuating element, via the actuator, actuates movement of the switching element from the first switching position into the second switching position and/or vice versa. The running roller is arranged on the actuating element.

7 Claims, 27 Drawing Sheets

(51) Int. Cl.
*F16H 25/18* (2006.01)
*F16H 63/30* (2006.01)
*F16D 11/00* (2006.01)
*F16D 23/12* (2006.01)

(56) References Cited

U.S. PATENT DOCUMENTS

| | | | |
|---|---|---|---|
| 2012/0255382 A1* | 10/2012 | Richter | F16H 63/304 |
| | | | 74/333 |
| 2013/0112522 A1 | 5/2013 | Granzow et al. | |
| 2015/0285375 A1* | 10/2015 | Volpert | F16H 63/28 |
| | | | 74/473.36 |
| 2015/0330506 A1* | 11/2015 | Volpert | F16H 63/18 |
| | | | 74/473.36 |

* cited by examiner

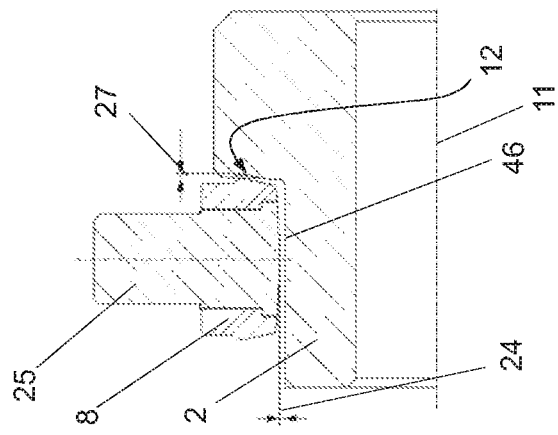
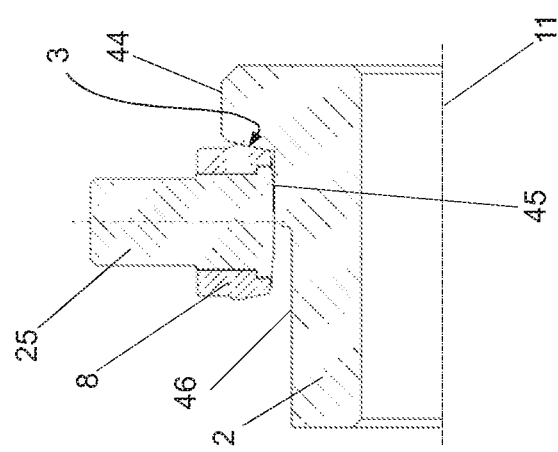
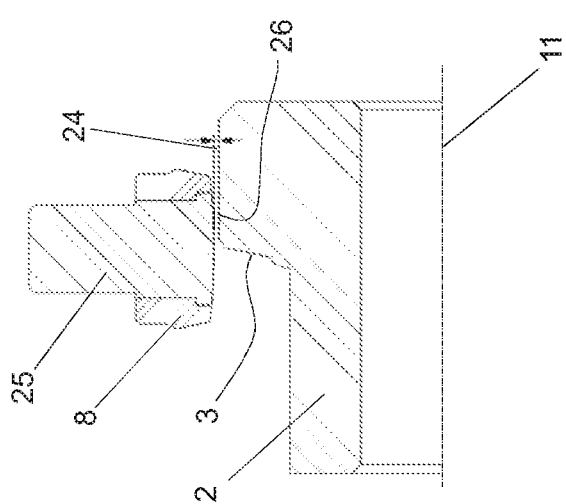

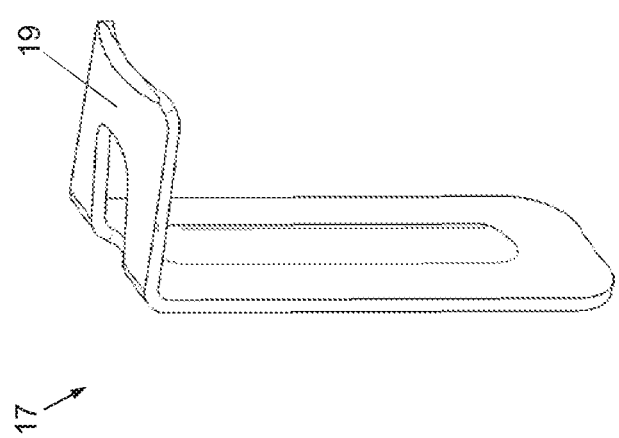

CLUTCH ARRANGEMENT FOR A DRIVE TRAIN OF A MOTOR VEHICLE

CROSS-REFERENCE TO RELATED APPLICATION

This application claims priority to German Application No. DE 102017202248.5 filed on Feb. 13, 2017. The entire disclosure of the above application is incorporated herein by reference.

TECHNICAL FIELD

The present invention relates to a clutch arrangement for a drive train of a motor vehicle comprising a switching element with a control geometry, the switching element being arranged on an output element such that it is fixed in terms of rotation but can be moved axially, namely can be moved selectively into a first switching position and into a second switching position, an actuator, it being possible for the movement of the switching element from the first switching position into the second switching position and/or vice versa to be actuated via the actuator, and an actuating element, via which the actuator actuates the movement of the switching element from the first switching position into the second switching position and/or vice versa.

BACKGROUND

A wide variety of structural embodiments of clutch arrangements are frequently used in a drive train in the automotive technology sector. They serve for the optional drive-connection of a drive element to an output element. Clutch arrangements of the type in question are used in particular in motor vehicles with all wheel drive and in motor vehicles having a hybrid drive. In this case, they serve for selectively shutting down partial regions of the drive train in order in such a manner to prevent unnecessary rotation and therefore unnecessary consumption of energy of those partial regions of the drive train that are to be shut down.

In particular in the region of use of motor vehicles with all wheel drive, reliable separation of the partial regions of the drive train and requirement-related and highly dynamic switching on of the respective partial regions of the drive train are desired without a high expenditure of energy.

Document DE 10 2011 085 839 A1 describes, for example, a clutch device with two clutch parts which are coupleable by means of a sliding sleeve, namely a first clutch part and a second clutch part which, in the engaged state, are coupled to each other in a positively locking manner via the sliding sleeve. The sliding sleeve is attached in an axially displaceable manner to the first clutch part for rotation therewith. The sliding sleeve has, on its circumferential surface, at least one first step which has a first step flank and extends with a first step profile on the circumferential surface of the sliding sleeve. The first step profile also has an axial directional component in the direction of the rotational axis of the first clutch part. An adjusting means which is displaceable to and fro between an adjusting-means-coupling position and an adjusting-means-decoupling position lies, during the decoupling operation of the two clutch parts, in its adjusting-means-decoupling position in the first step flank of the sliding sleeve, and therefore, during rotation of the first clutch part, the sliding sleeve is moved axially away from the second clutch part into a sleeve-decoupling position. Furthermore, the sliding sleeve is supported by means of an axially acting spring, and therefore a spring force holds the sliding sleeve in a sleeve-coupling position mechanically coupling the first and the second clutch part to each other, or slides into the sliding sleeve said sleeve-coupling position when the adjusting means is in its adjusting-means-coupling position. In the described embodiment of the coupling device, the sliding sleeve is held in the decoupling position via the adjusting means, in the adjusting-means-decoupling position thereof, thus resulting in an increased expenditure of energy.

SUMMARY

It is an object of the invention to specify a clutch arrangement for the selective connecting of a drive element to an output element in a drive train of a motor vehicle, said clutch arrangement being distinguished by a requirement-appropriate and energy-optimized operation.

The object is achieved by a clutch arrangement for a drive train of a motor vehicle comprising a switching element with a control geometry, the switching element being arranged on an output element such that it is fixed in terms of rotation but can be moved axially, namely can be moved selectively into a first switching position and into a second switching position, the output element being drive-connected to a drive element in the first switching position of the switching element, and the output element not being drive-connected to the drive element in the second switching position of the switching element, an actuator, it being possible for the movement of the switching element from the first switching position into the second switching position and/or vice versa to be actuated via the actuator, an actuating element, via which the actuator actuates the movement of the switching element from the first switching position into the second switching position and/or vice versa, and a running roller which is arranged on the actuating element, it being possible for the actuating element to be actuated via the actuator in the first switching position of the switching element in such a way that the running roller can be brought into engagement with the control geometry of the switching element, with the result that the switching element can be transferred from the first switching position into the second switching position.

According to the invention, the clutch arrangement comprises a switching element, an actuator, an actuating element and a running roller.

According to the invention, the switching element is arranged on an output element, for example on a first shaft, such that it is fixed in terms of rotation but can be moved axially. According to the present invention, the switching element has an axially effective control geometry.

The terminology "axially" describes a direction along or parallel to a central rotational axis of the output element.

According to the present invention, the switching element can be selectively moved axially into a first switching position and into a second switching position, the output element being drive-connected to a drive element, for example to a second shaft, in the first switching position of the switching element, and the output element not being drive-connected to the drive element in the second switching position of the switching element.

According to the invention, it is possible for the movement of the switching element from the first switching position into the second switching position and/or vice versa to be actuated via the actuator of the clutch arrangement.

Furthermore according to the invention, the actuation of the axial movement of the switching element from a first switching position into a second switching position and/or vice versa takes place by means of the actuator via the actuating element.

According to the present invention, a running roller is arranged on the actuating element in a fixed position, i.e. is neither movable axially nor radially.

According to the present invention, it is possible for the actuating element to be actuated via the actuator in the first switching position of the switching element in such a way that the running roller can be brought into engagement with the control geometry of the switching element. The switching element can thus be transferred from the first switching position into the second switching position.

By means of the design according to the invention of the clutch arrangement, it is possible to realise efficient and highly dynamic switching of the switching element in a simple manner. Electrical auxiliary energy is required merely for actuating the axial movement of the switching element from the first switching position into the second switching position and/or vice versa. A substantial portion of the energy required for the movement of the switching element is taken from the rotating drive train of the motor vehicle.

By means of an appropriate design of the actuator, it is possible to provide a bistable behaviour ("stay silent") or a currentlessly closed behaviour ("normally closed") of the clutch arrangement according to the invention depending on failure requirements.

Developments of the invention are specified in the dependent claims, the description and in the attached drawings.

In a preferred variant embodiment of the present invention, the clutch arrangement has a holding mechanism which locks the switching element mechanically in the first switching position and in the second switching position.

An energy-optimized holding of the switching element in the first and the second switching position is thereby ensured.

The holding mechanism preferably has a braking element which is arranged on the actuating element and which, upon the actuation of a movement of the switching element from the second switching position into the first switching position, acts on the holding mechanism in such a way that the mechanical locking of the switching element in the second switching position is released and thus the movement of the switching element from the second switching position into the first switching position is initiated.

The braking element can act on the holding mechanism in a frictionally locking or positively locking manner.

The actuating element can preferably be pivoted about a rotational axis which runs parallel to a central rotational axis of the output element.

The actuation of the actuating element can take place via the actuator in an electromechanical, electrohydraulic or electromagnetic manner.

The actuating element is preferably of substantially crescent-shaped configuration, i.e. is in the form of the blade of a sickle. The terminology "crescent-shaped" describes a substantially semi-circular shaping in this case.

In addition to optimized use of the construction space, the crescent-shaped design of the actuating element permits energy-efficient triggering of the axial movement of the switching element from the first switching position into the second switching position and/or vice versa.

The control geometry of the switching element preferably has at least one undercut, with the result that, in the first switching position of the switching element and/or in the second switching position of the switching element, the running roller is situated in an all-round clearance with respect to the control geometry.

DRAWINGS

The invention will be described below by way of example with reference to the drawings.

FIG. 9a-FIG. 9c show the position of a running roller and a control geometry of a switching element in different lifting and rotational angle positions.

FIG. 10 shows a perspective view of a first holding element.

DESCRIPTION

Figure 27:
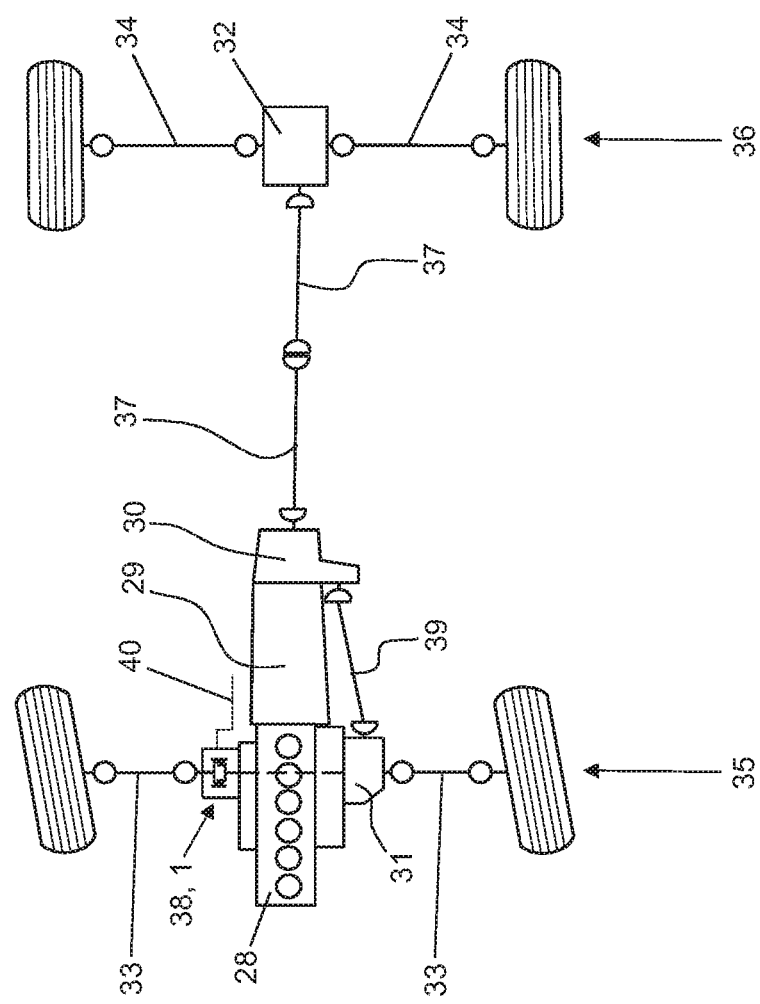
FIG. 27 shows an exemplary motor vehicle architecture with a clutch arrangement.

FIG. 1 to FIG. 26 show an exemplary variant embodiment of a clutch arrangement 1 according to the invention in different details, switching positions and perspectives. FIG. 27 shows an exemplary motor vehicle architecture with a clutch arrangement 1 according to the invention.

The exemplary variant embodiment of the clutch arrangement 1 according to the invention that is illustrated in FIG. 1 to FIG. 26 serves for the selective connection of an output element 5, here a first shaft, to a drive element 4, here a second shaft, such that torque can be transmitted selectively from the drive element 4 to the output element 5 and/or vice versa.

The clutch arrangement 1 comprises a switching element 2 with a control geometry 3, an actuator 6, an actuating element 7, a running roller 8, a braking element 9 and a holding mechanism 16.

Figure 1:
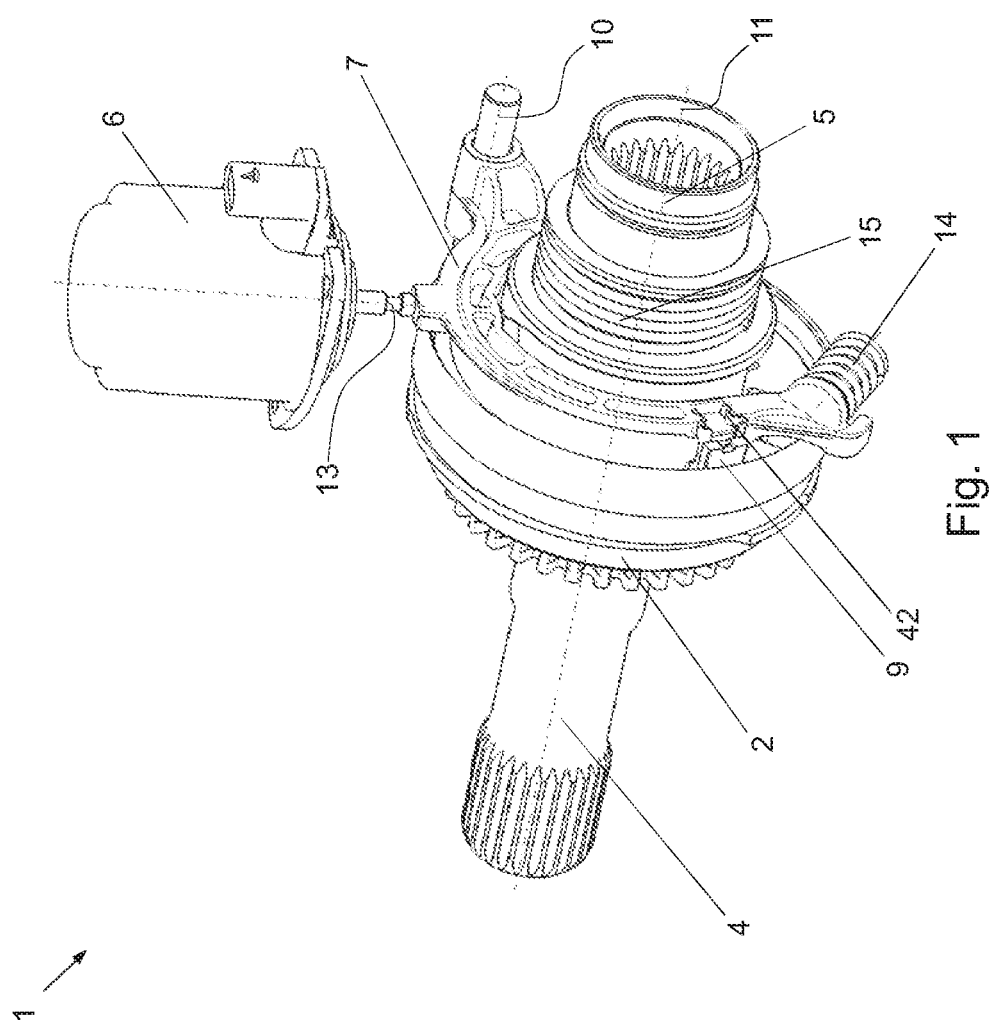
FIG. 1 shows a perspective view of a clutch arrangement, and an inlet element and an outlet element.
Figure 2:
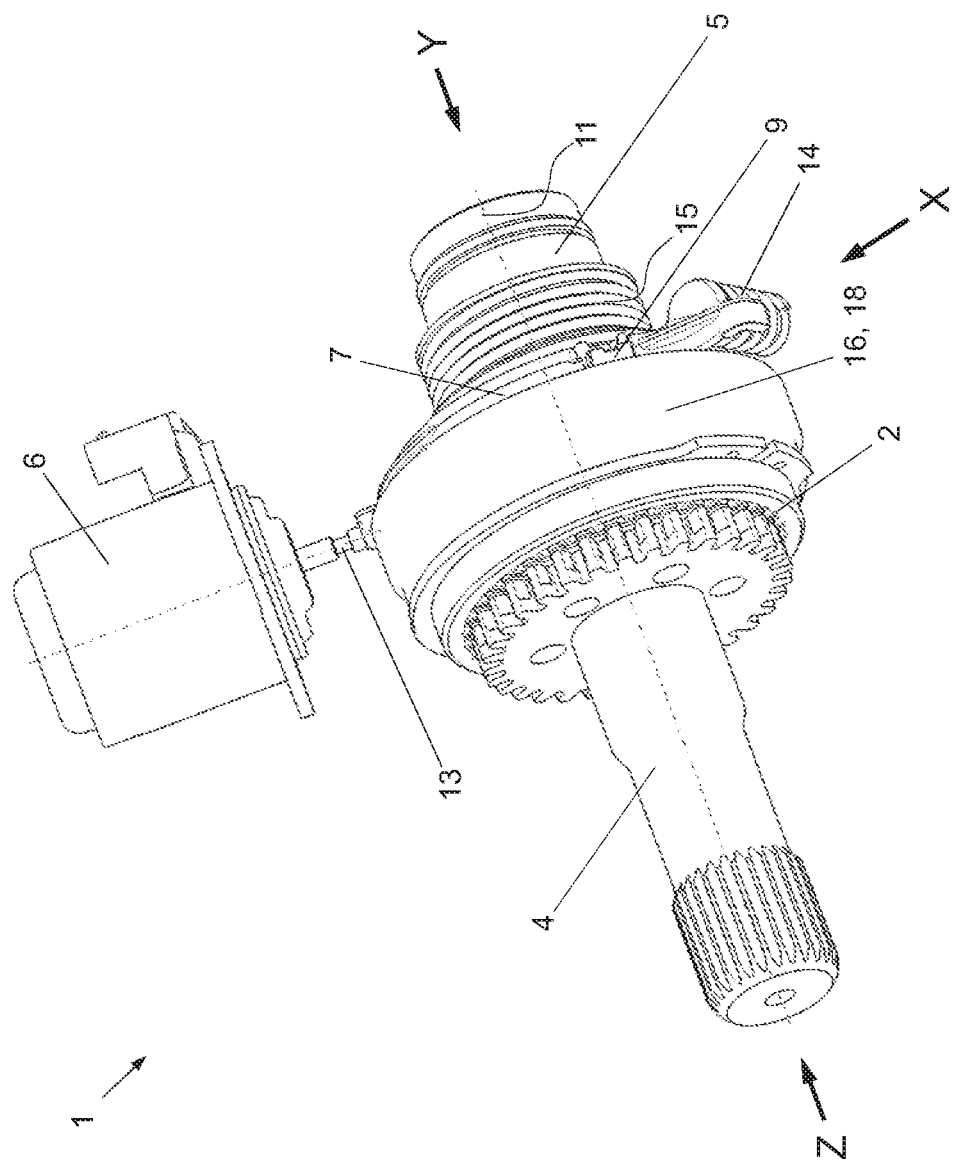
FIG. 2 shows a further perspective view of a clutch arrangement, and an inlet element and an outlet element.
Figure 3:
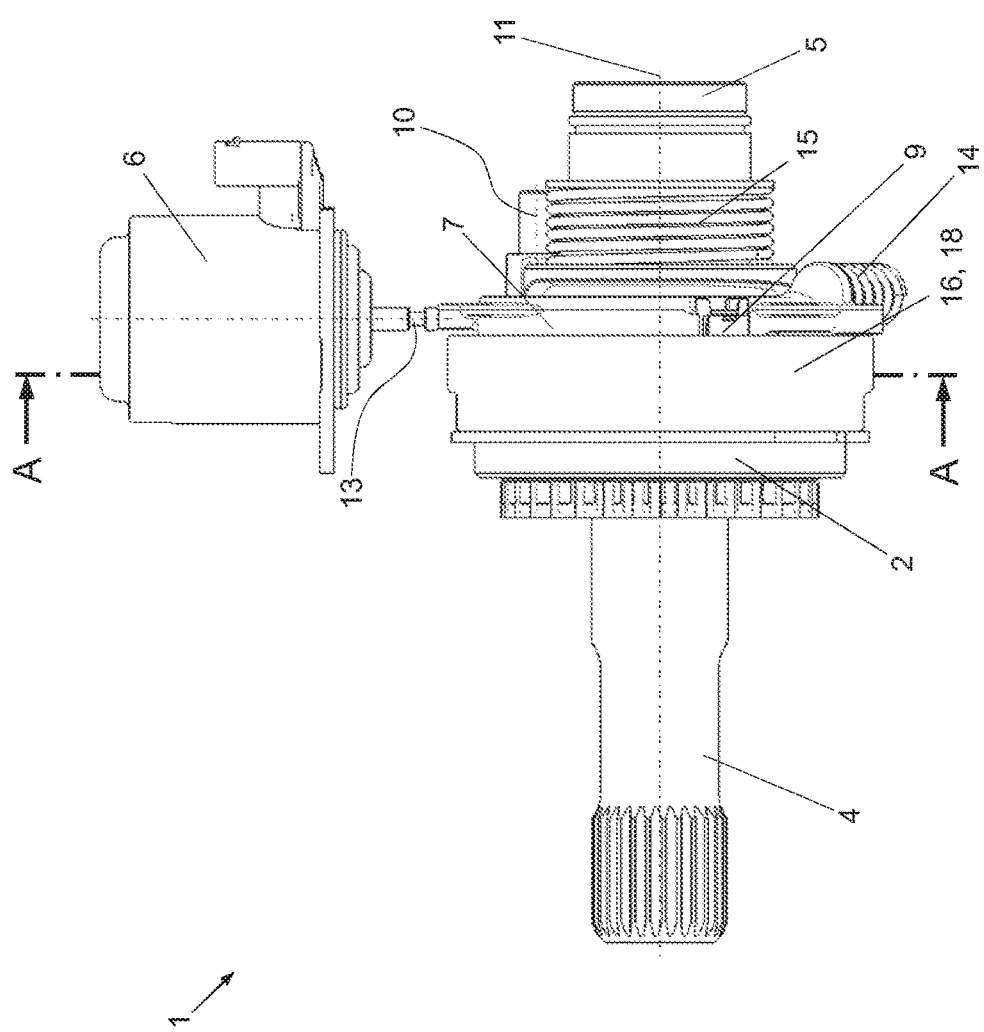
FIG. 3 shows a longitudinal view of a clutch arrangement, and an inlet element and an outlet element looking from point X according to FIG. 2.
Figure 4:
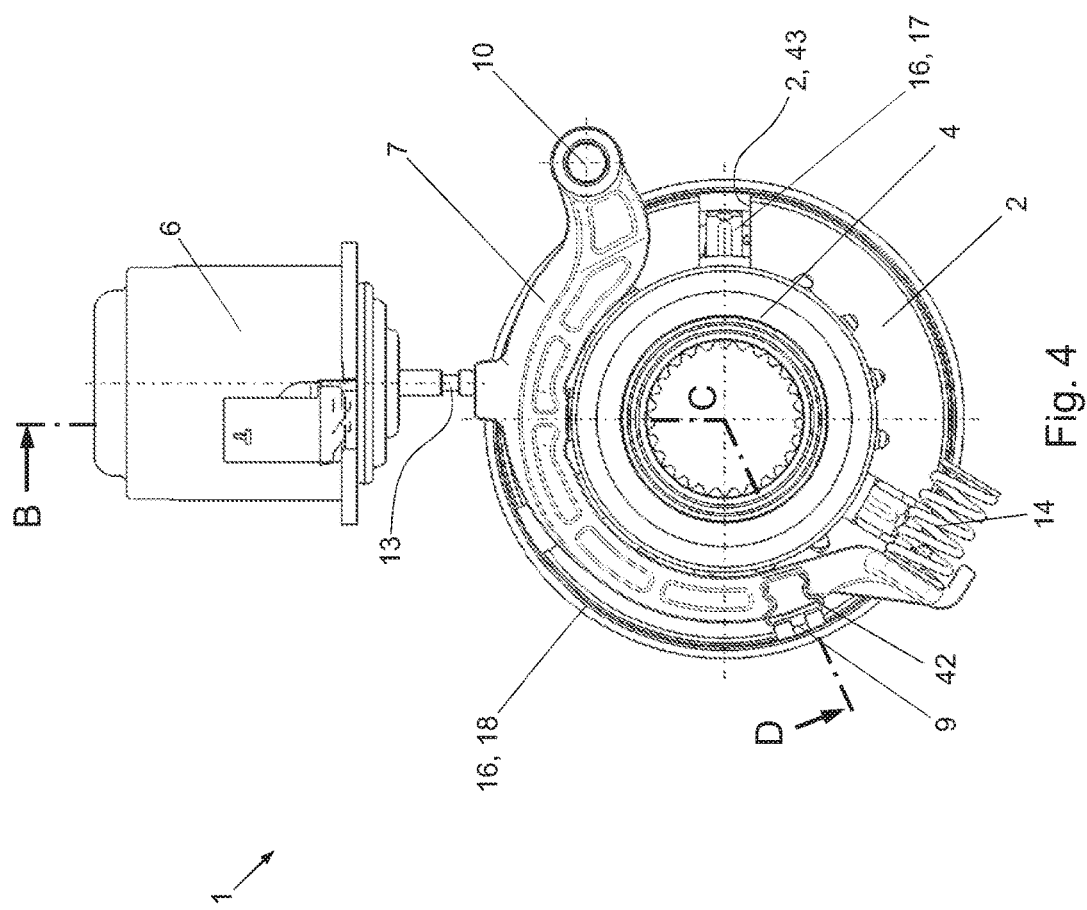
FIG. 4 shows a transverse view of a clutch arrangement, and an inlet element and an outlet element looking from point Y according to FIG. 2.
Figure 5:
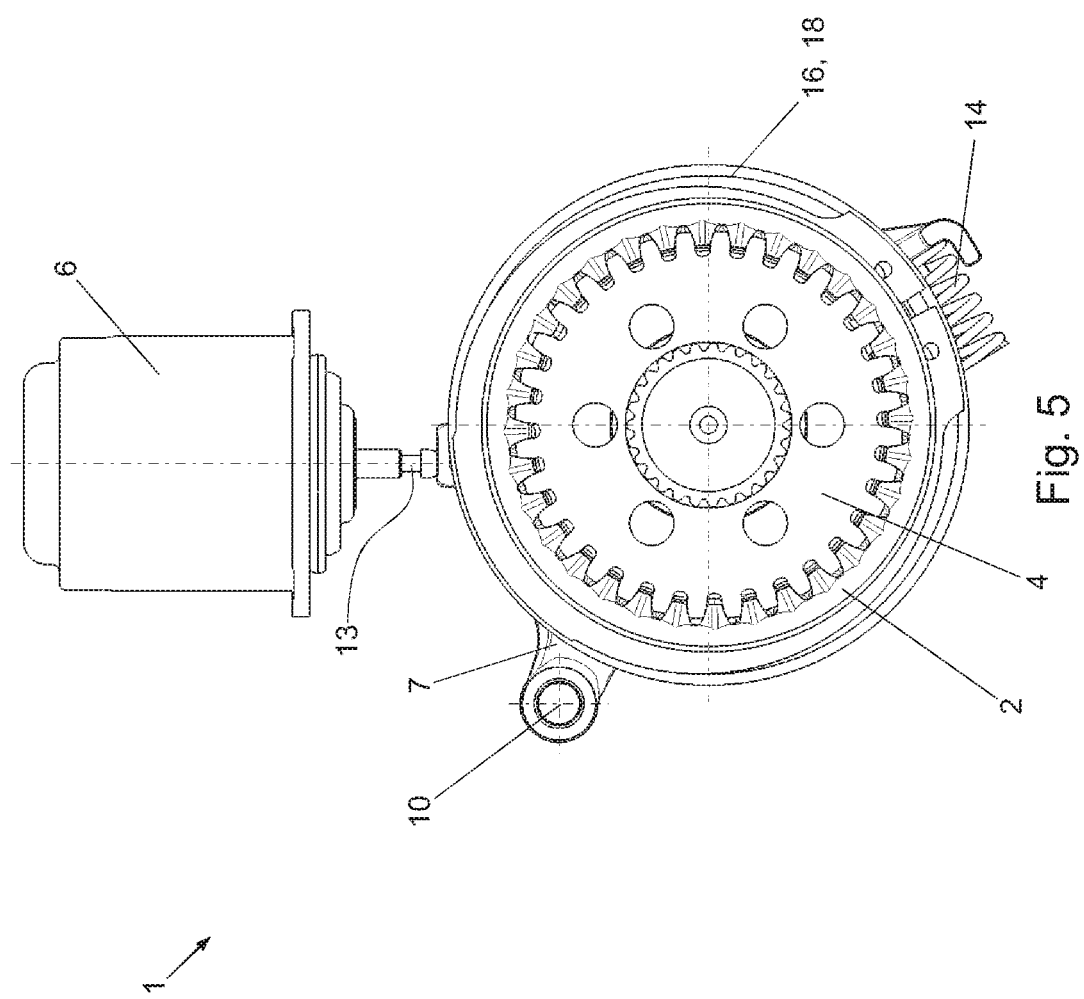
FIG. 5 shows a further transverse view of a clutch arrangement, and an inlet element and an outlet element looking from point Z according to FIG. 2.
Figure 6:
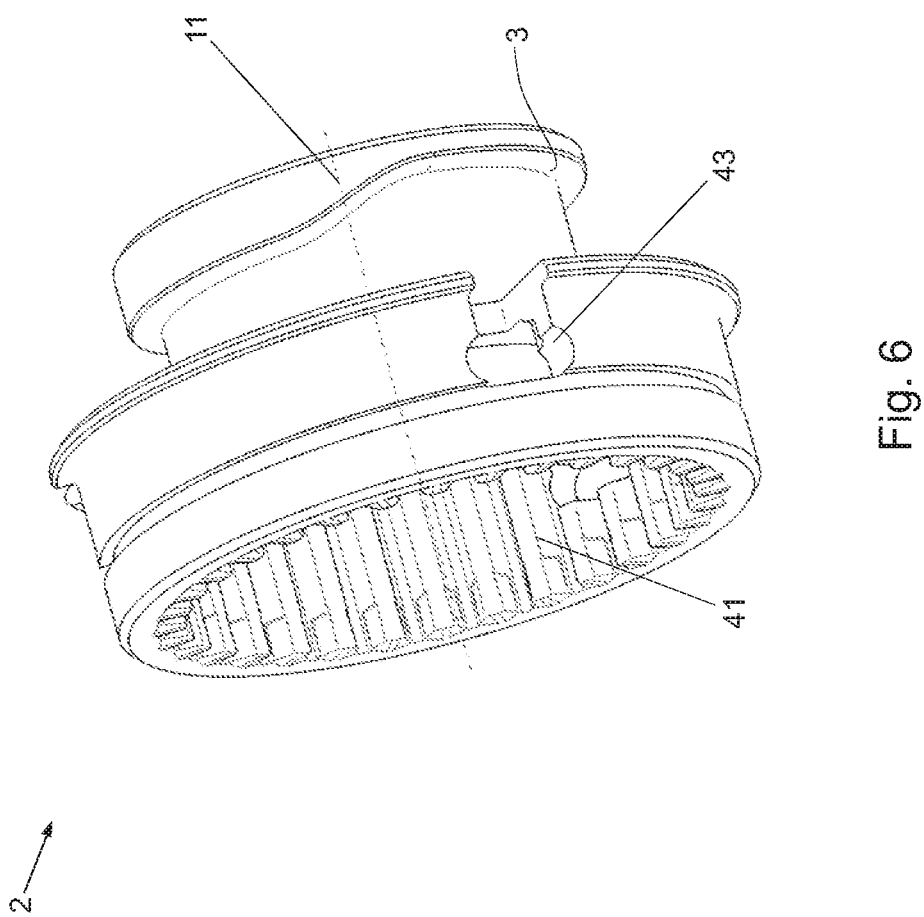
FIG. 6 shows a perspective view of a switching element.
Figure 7B:
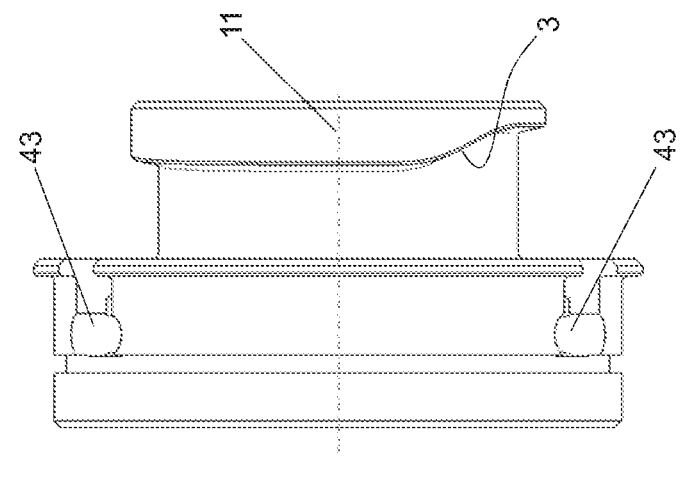
FIG. 7b shows a further longitudinal view of a switching element.
Figure 7A:
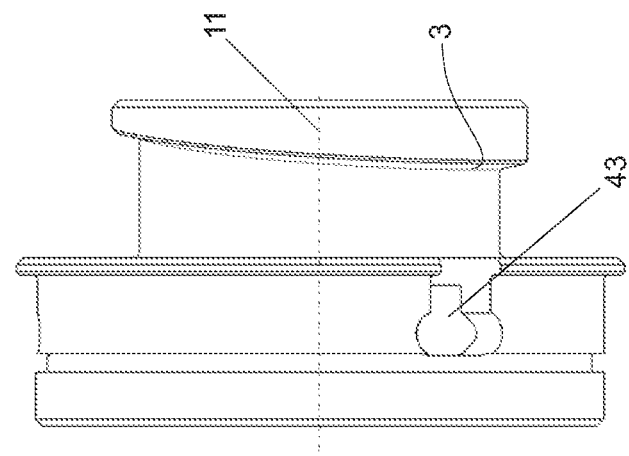
FIG. 7a shows a longitudinal view of a switching element.
Figure 8:
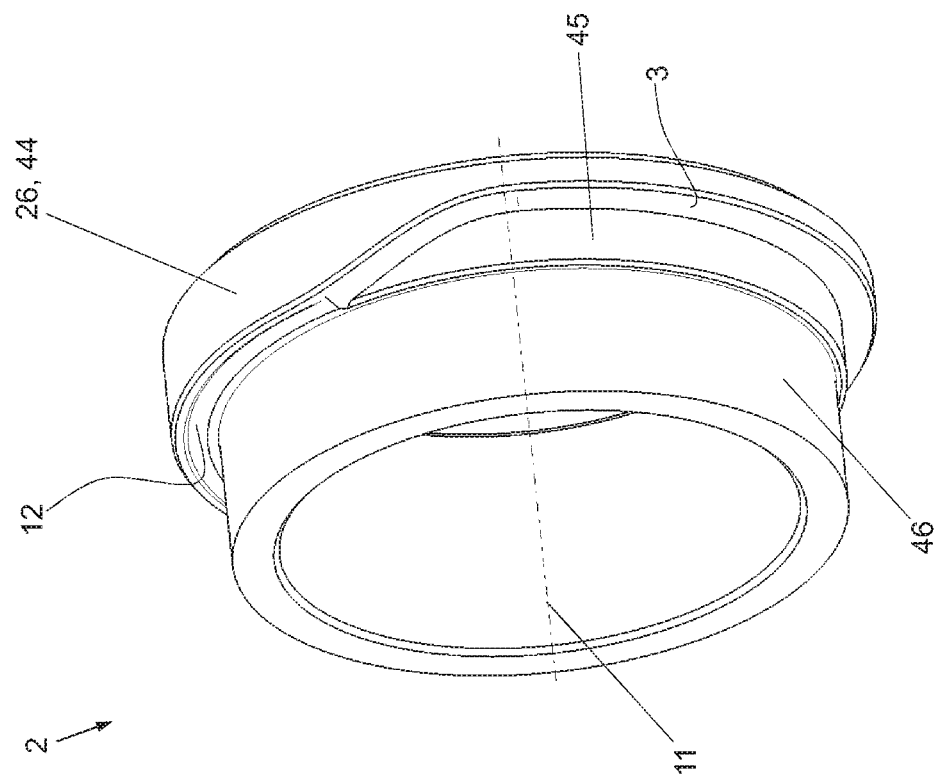
FIG. 8 shows an isometric detailed view of a switching element with an undercut introduced in the control geometry.

The switching element 2 is illustrated in different detailed illustrations in FIG. 6 to FIG. 9. In the present exemplary embodiment, the switching element 2 is designed as a switching sleeve. The switching element 2 is arranged on the output element 5 via a carry-along toothing 41, which is formed in regions on the inner circumferential surface of the switching element 2, such that it is fixed in terms of rotation but can be displaced axially (FIG. 1 to FIG. 6). The switching element 2 comprises a first radial portion 44, a second radial portion 45 and a third radial portion 46 in different axial positions (FIG. 8). The switching element 2 has an axially effective control geometry 3. The control geometry 3 of the switching element has an undercut 12 for all-round clearance of the running roller 8 with respect to the control geometry 3 in the first switching position of the switching element 2 (FIG. 8, FIG. 9c). The contour of the control geometry 3 can be derived in an advantageous manner from an acceleration profile. This takes place by definition of the acceleration as a function of the rotational angle via functions which are continuously differentiable twice, for example by stipulating support points of cubic spline functions. This has an advantageous effect on the dynamic and on the acoustic behaviour of the clutch arrangement 1. Limiting values for the maximum acceleration such as, for example, 10 g, and for the maximum speed, such as, for example, 1 m/s, of the switching element 2 to be moved can be taken into consideration as boundary conditions. However, it is not exclusively the maximum values of speed and acceleration which are crucial, but primarily the avoidance of discontinuities in the jolt (first derivation of the acceleration). In addition, a pre-lobe design enables play to be compensated for and serves for prestressing the system at the beginning of the lift. The terminology "axially" describes a direction along or parallel to a central rotational axis 11 of the output element 4. The switching element 2 can be selectively moved axially into a first switching position and into a second switching position.

The output element 5 is drive-connected to the drive element 4, here a second shaft, in the first switching position of the switching element 2. FIG. 12 to FIG. 15 show different illustrations of the clutch arrangement 1 with the switching element 2 in the first switching position. The output element 5 is not drive-connected to the drive element 4 in the second switching position of the switching element 2. FIG. 23 to FIG. 26 show different illustrations of the clutch arrangement 1 with the switching element 2 in the second switching position.

In the present exemplary embodiment, the actuator 6 is designed in the form of an electromagnet. Depending on the design, i.e. depending on the desired behaviour of the actuator 6 in the currentless state, the actuator 6 has a coil, a spring or a permanently magnetic armature, and also a pin 13. It is possible for a first switching operation of the switching element 2, namely an axial movement of the switching element 2 from the first switching position into the second switching position, to be actuated via the actuator 6 (FIG. 16 to FIG. 22). Furthermore, it is possible for a second switching operation, namely an axial movement of the switching element 2 from the second switching position into the first switching position, to be actuated via the actuator 6 (not illustrated).

The actuating element 7 of the clutch arrangement 1 is of substantially crescent-shaped configuration and is pivotable about a rotational axis 10 which, in the present case, is fixed on the housing. The rotational axis 10 which is fixed on the housing runs parallel to the central rotational axis 11 of the output element 5. A running roller 8 and also a braking element 9 are arranged on the actuating element 7 in a fixed position, i.e. neither movable axially nor radially. The terminology "radially" describes a direction normal to the central rotational axis 11 of the output element 5.

The braking element 9 is part of the holding mechanism 16 of the clutch arrangement 1 and is connected to the actuating element 7 via a fastening element 42 which is spring-mounted in the radial direction with respect to the central rotational axis 11. The switching element 2 is held mechanically in the first switching position and in the second switching position via the holding mechanism 16 of the clutch arrangement 1. The holding mechanism 16 comprises a first elastic element 14, a first holding element 17 and a second holding element 18.

The second elastic element 15 is designed as a compression spring and is arranged on the output element 5 coaxially with respect to the switching element 2 between a stop formed on the switching element 2 and a stop (not illustrated) arranged fixedly on the output element 5. By means of the force of the second elastic element 15, the switching element 2 is pressed axially into the first switching position and is held mechanically in the first switching position.

The first holding element 17 is illustrated in FIG. 10. The first holding element 17 has at least one third elastic element 19, namely an elastic holding tab. In the present exemplary embodiment, the holding mechanism 16 comprises a plurality of first holding elements 17 which are designed as sheet-metal formed parts and have elastic holding tabs 19 which are connected to the output element 5 for rotation therewith and in an axially fixedly defined position.

Figure 11:
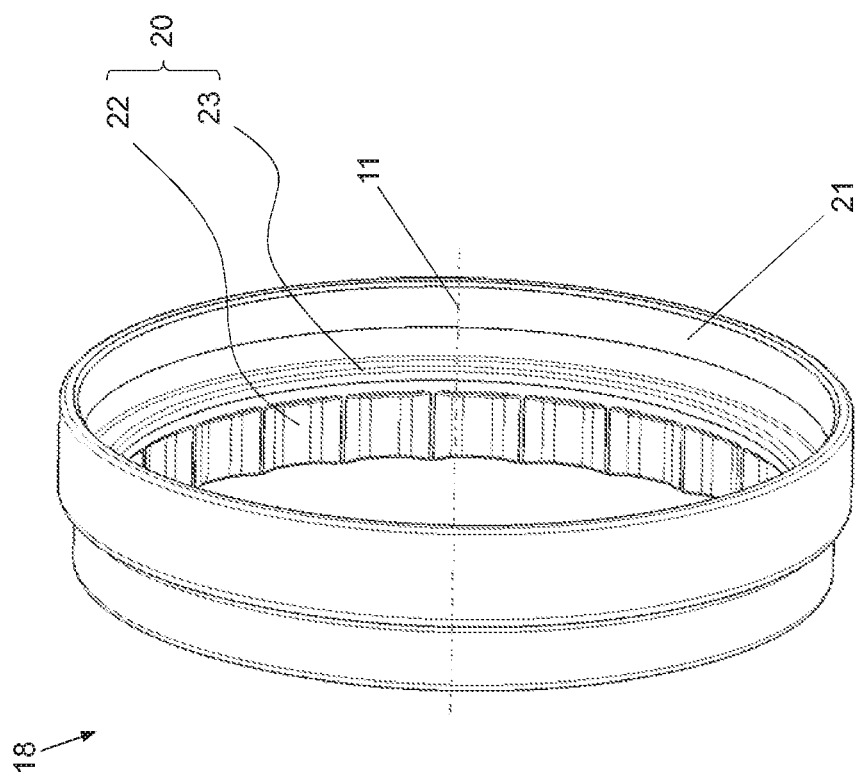
FIG. 11 shows a perspective view of a second holding element.
Figure 12:
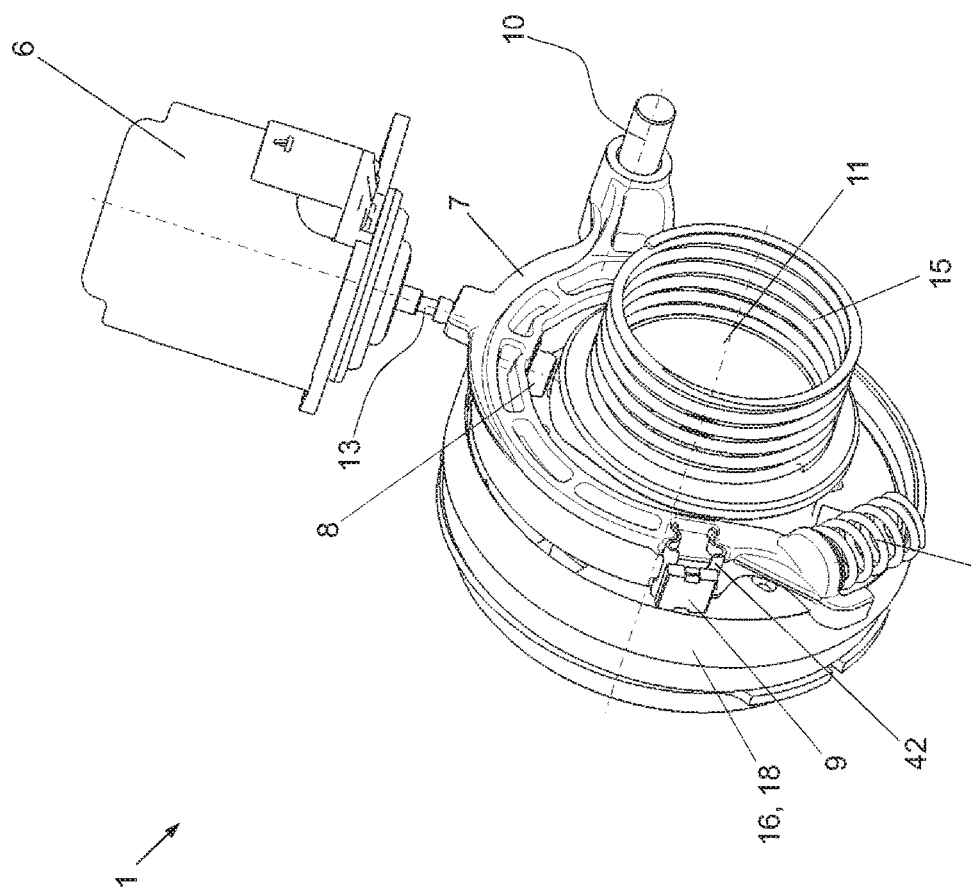
FIG. 12 shows a perspective illustration of the main components of a clutch arrangement in a first switching position.
Figure 13:
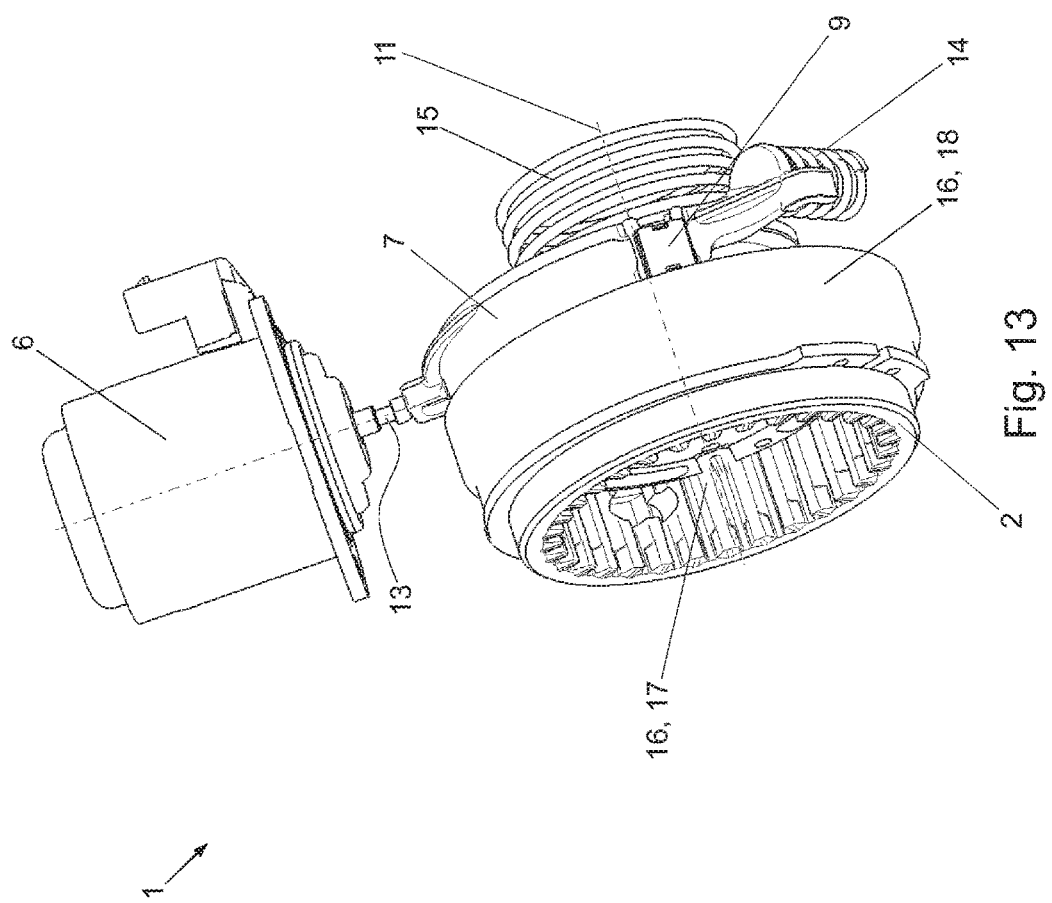
FIG. 13 shows a further perspective illustration of the main components of a clutch arrangement in a first switching position.
Figure 14:
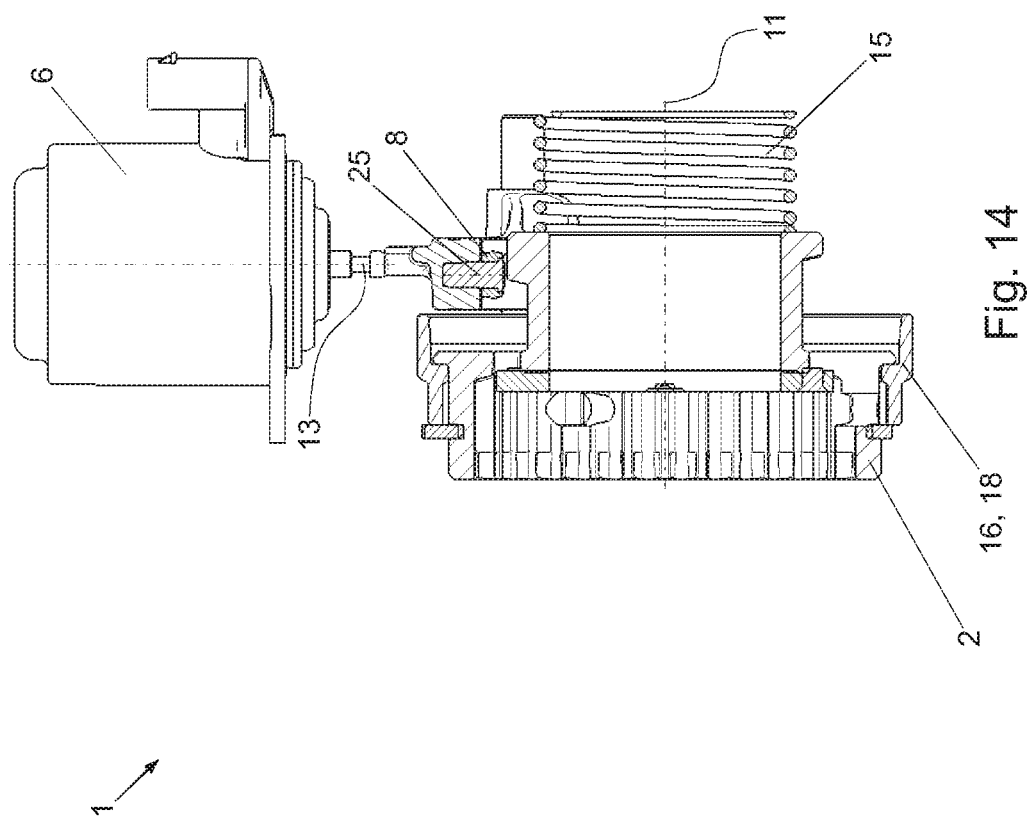
FIG. 14 shows a sectional view of the main components of a clutch arrangement in a first switching position along an intersecting plane B-C-D according to FIG. 19.
Figure 15:
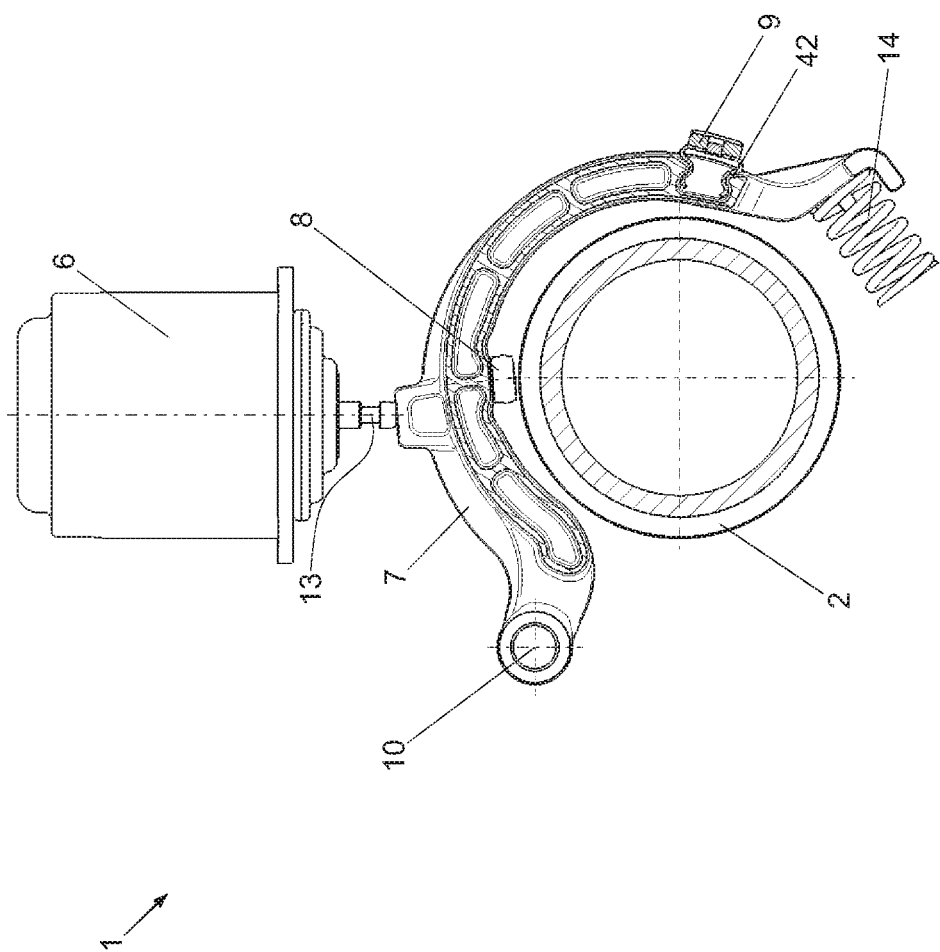
FIG. 15 shows a sectional view of the main components of a clutch arrangement in a first switching position along an intersecting plane A-A according to FIG. 18.
Figure 16:
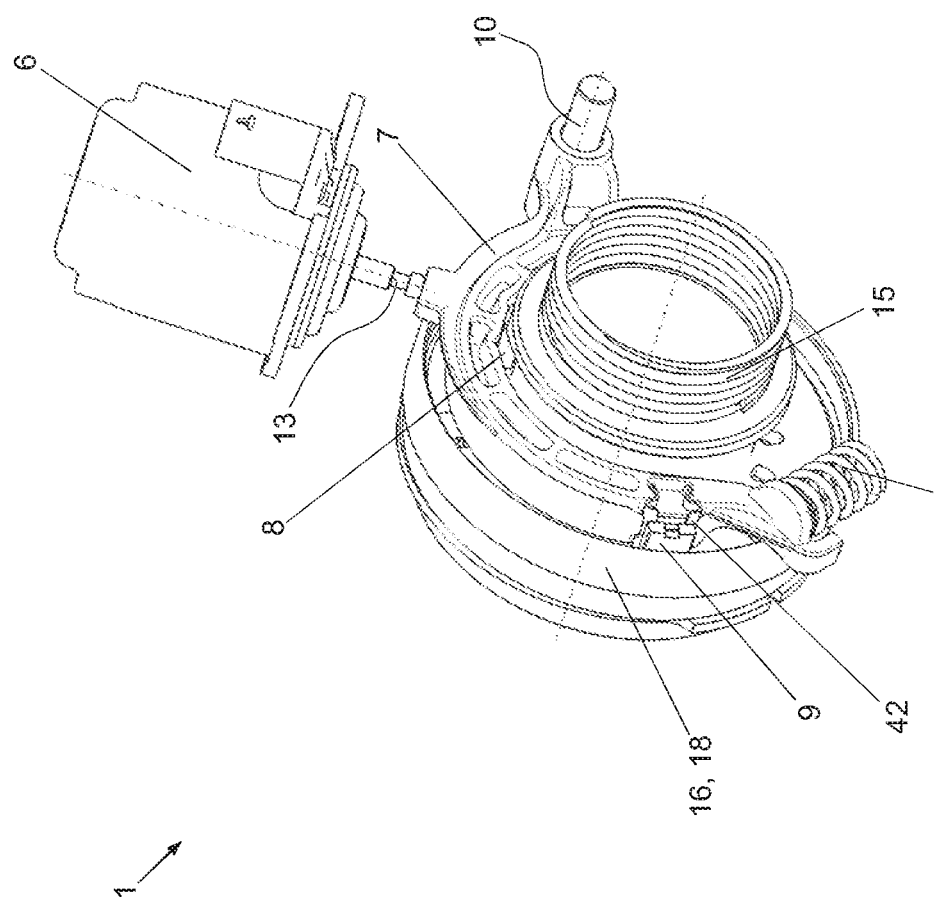
FIG. 16 shows a perspective view of the main components of a clutch arrangement during a first switching operation.
Figure 17:
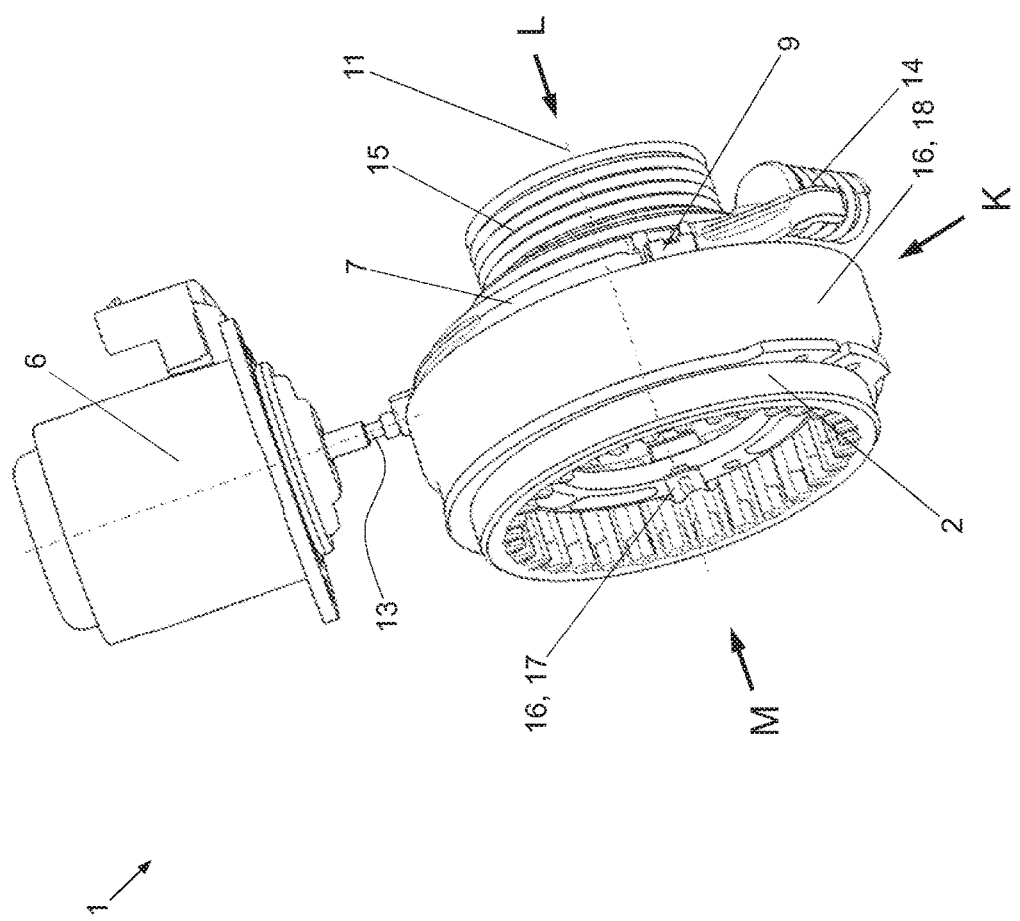
FIG. 17 shows a further perspective view of the main components of a clutch arrangement during a first switching operation.
Figure 18:
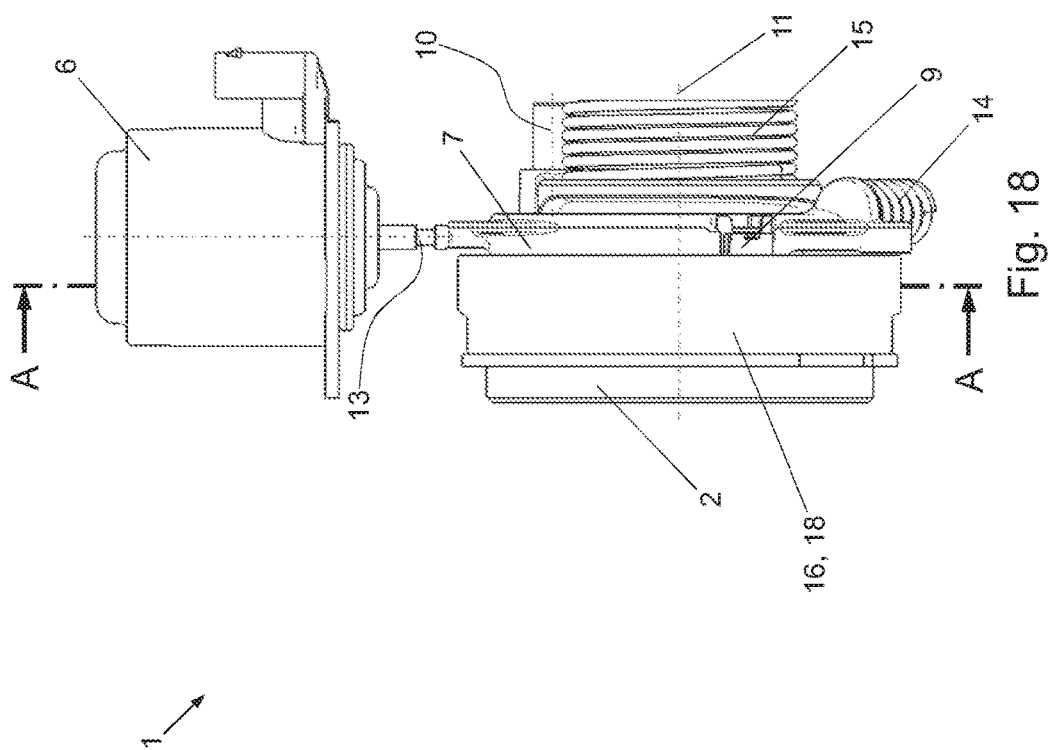
FIG. 18 shows a longitudinal view of the main components of a clutch arrangement during a first switching operation looking from point K according to FIG. 17.
Figure 19:
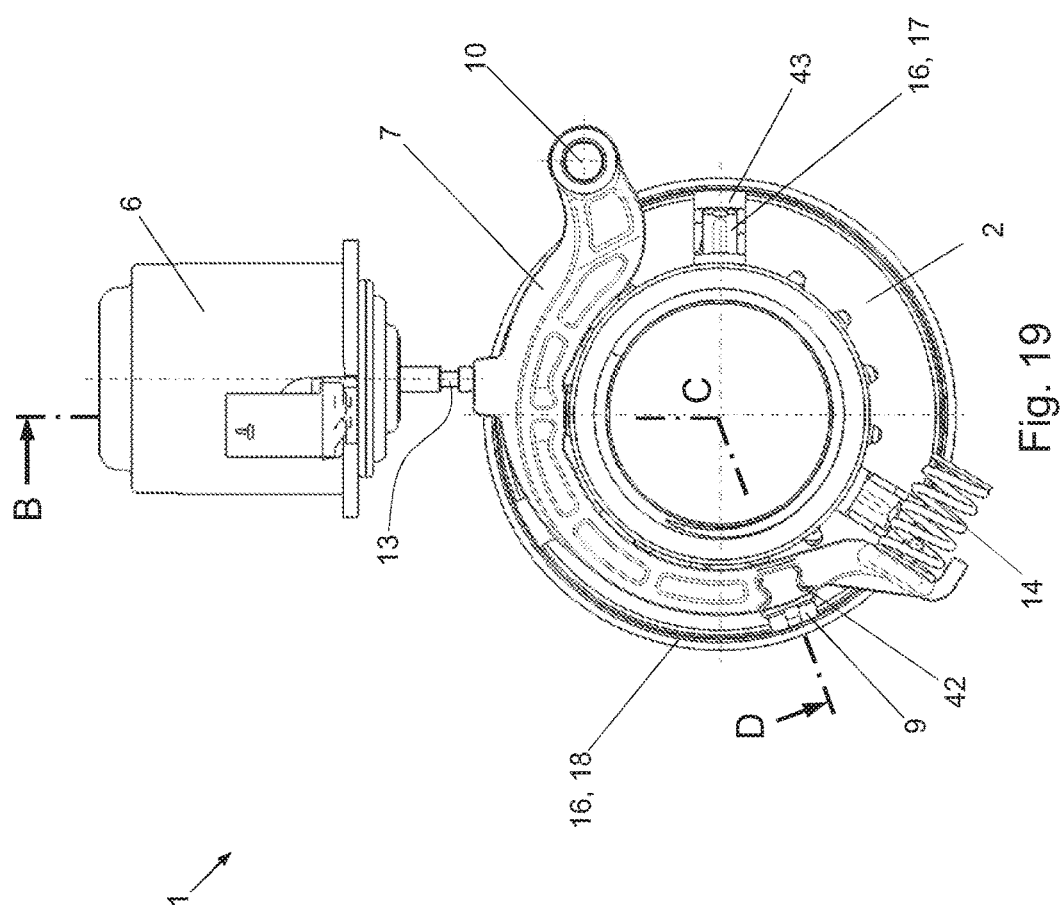
FIG. 19 shows a transverse view of the main components of a clutch arrangement during a first switching operation looking from point L according to FIG. 17.
Figure 20:
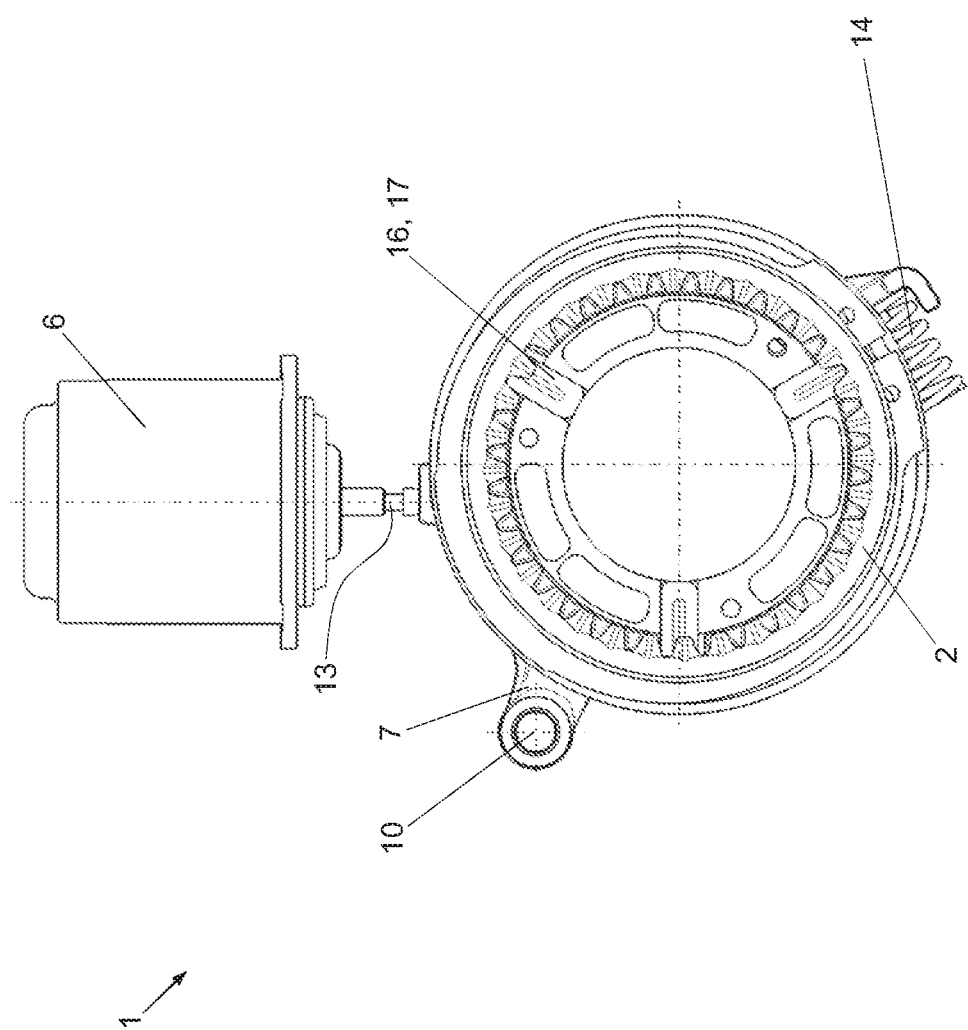
FIG. 20 shows a further transverse view of the main components of a clutch arrangement during a first switching operation looking from point M according to FIG. 17.
Figure 21:
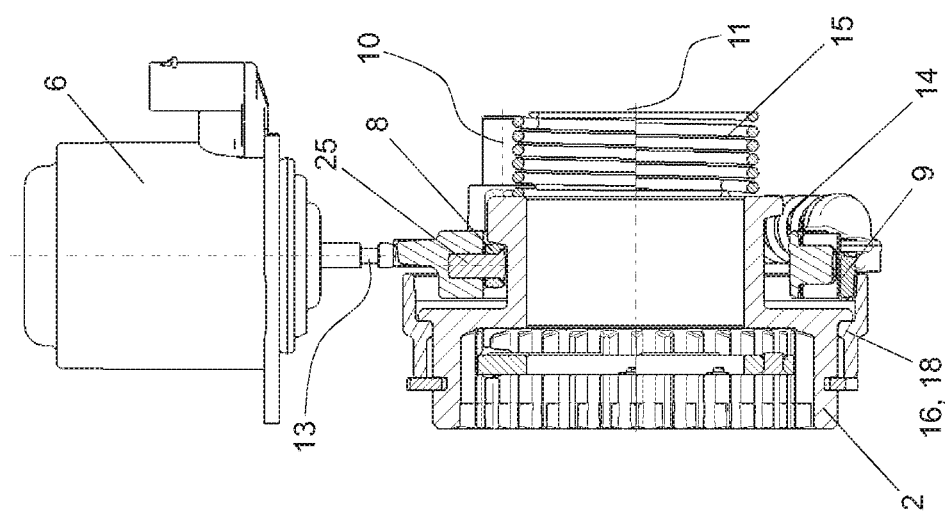
FIG. 21 shows a sectional view of the main components of a clutch arrangement during a first switching operation along the intersecting plane B-C-D according to FIG. 19.
Figure 22:
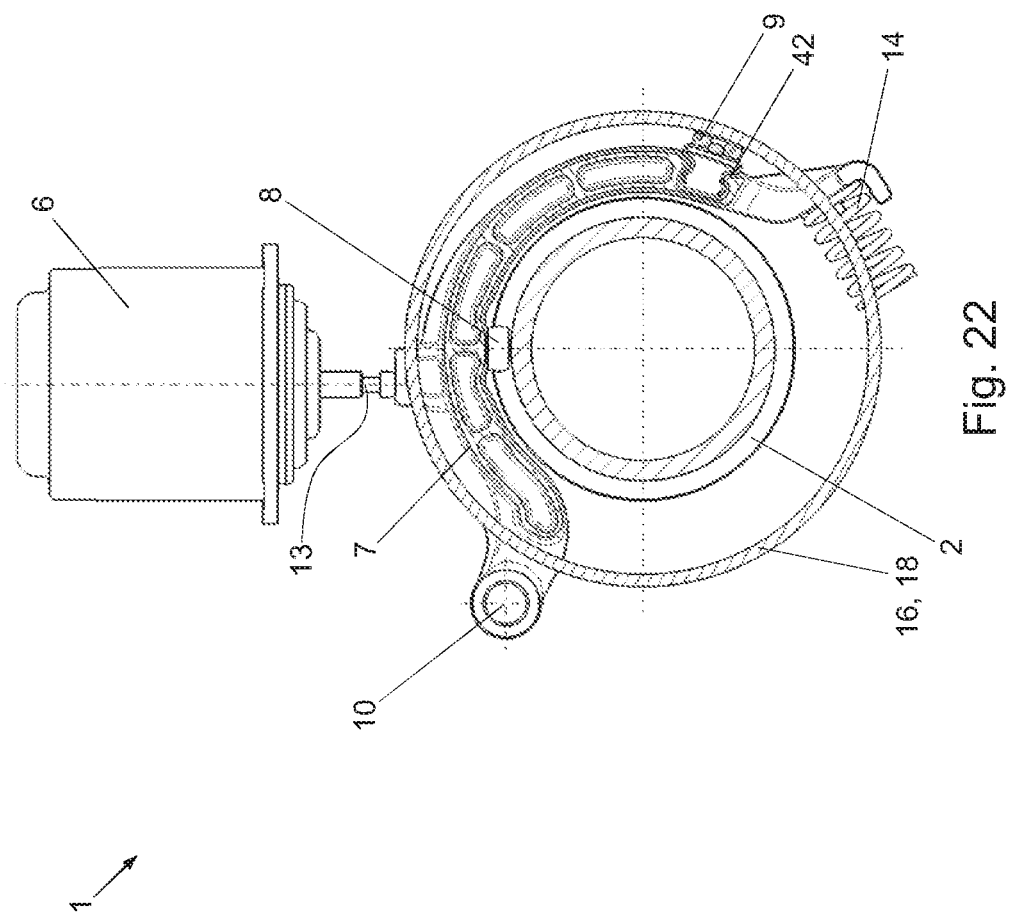
FIG. 22 shows a sectional view of the main components of a clutch arrangement during a first switching operation along the intersecting plane A-A according to FIG. 18.
Figure 23:
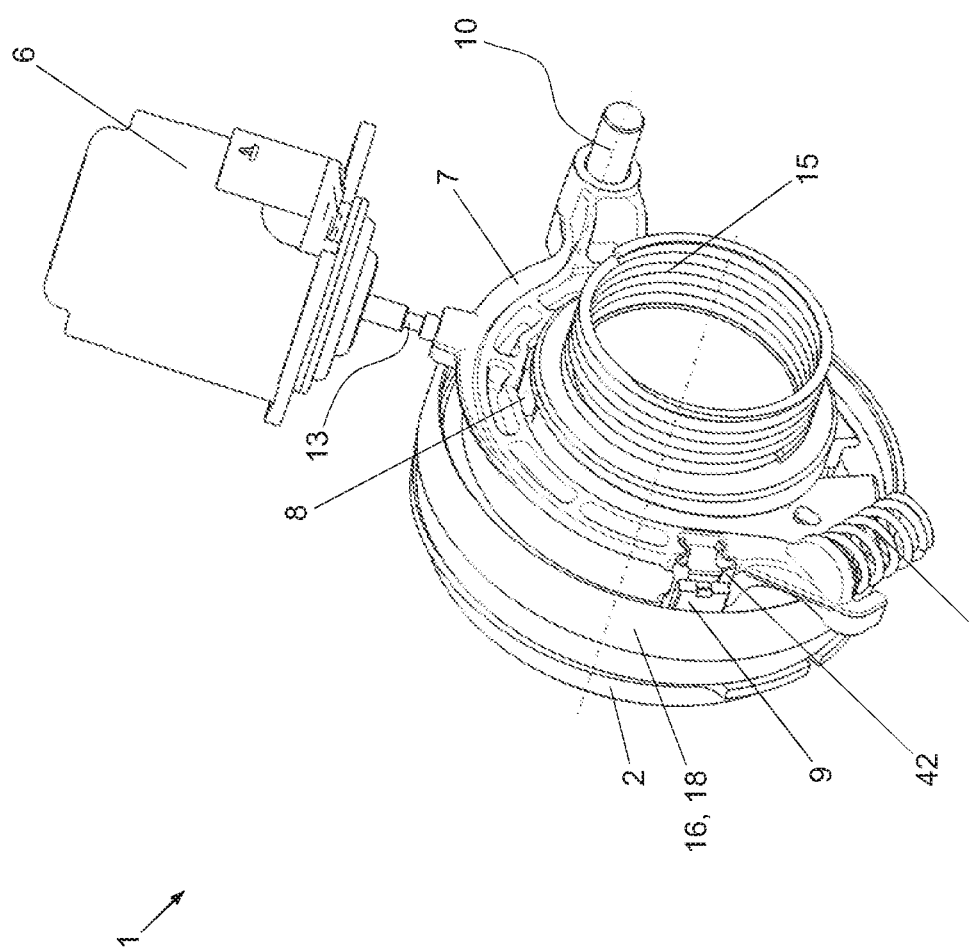
FIG. 23 shows a perspective illustration of the main components of a clutch arrangement in a second switching position.
Figure 24:
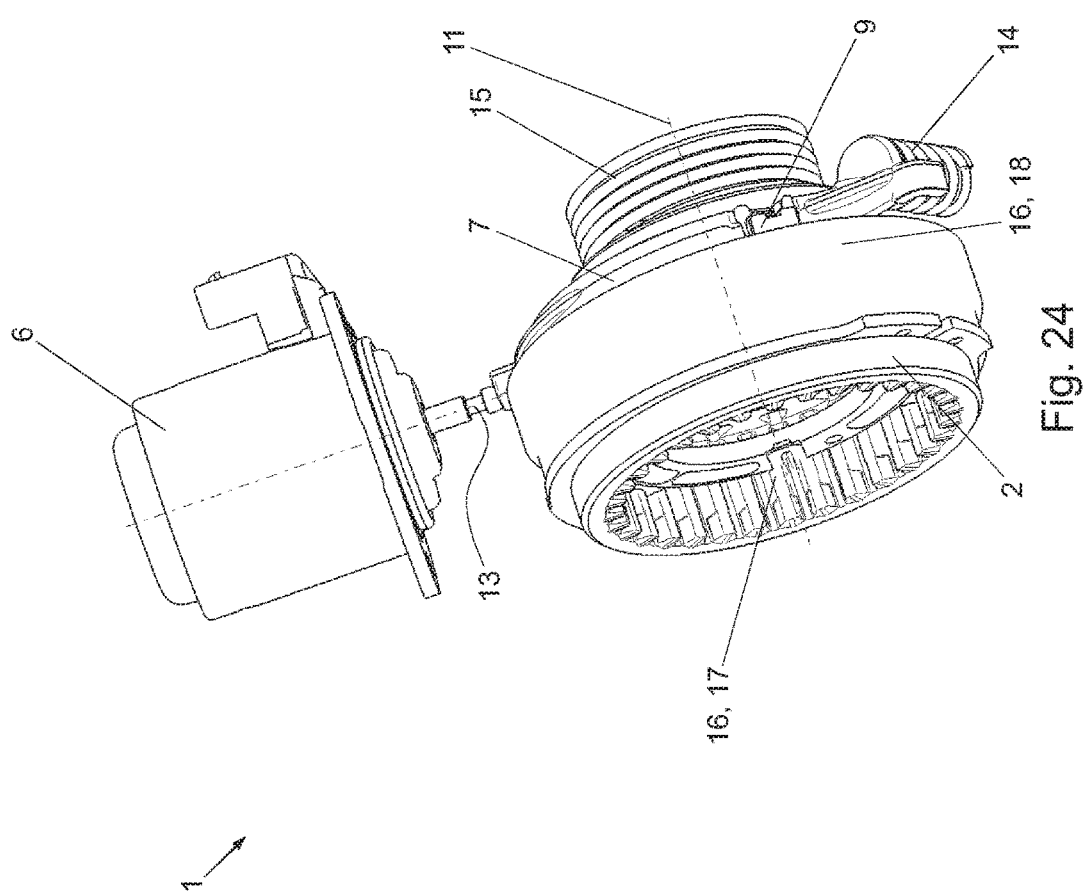
FIG. 24 shows a further perspective illustration of the main components of a clutch arrangement in a second switching position.
Figure 25:
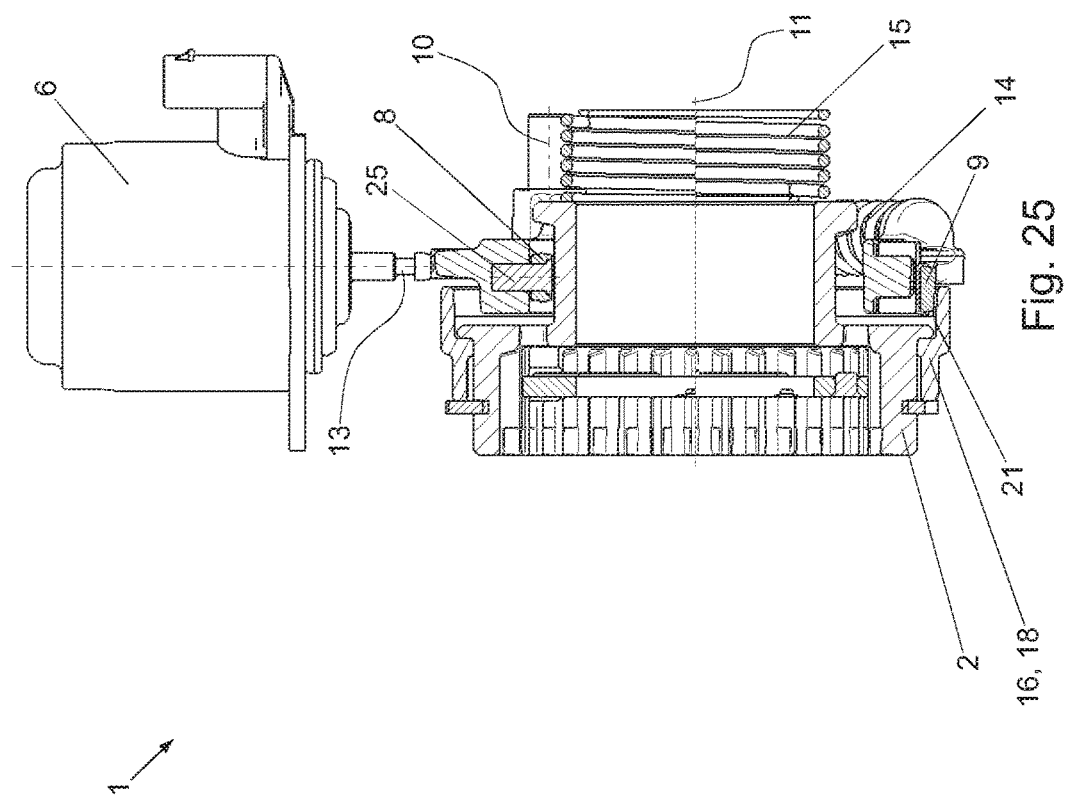
FIG. 25 shows a sectional view of the main components of a clutch arrangement in a second switching position along an intersecting plane B-C-D according to FIG. 19.
Figure 26:
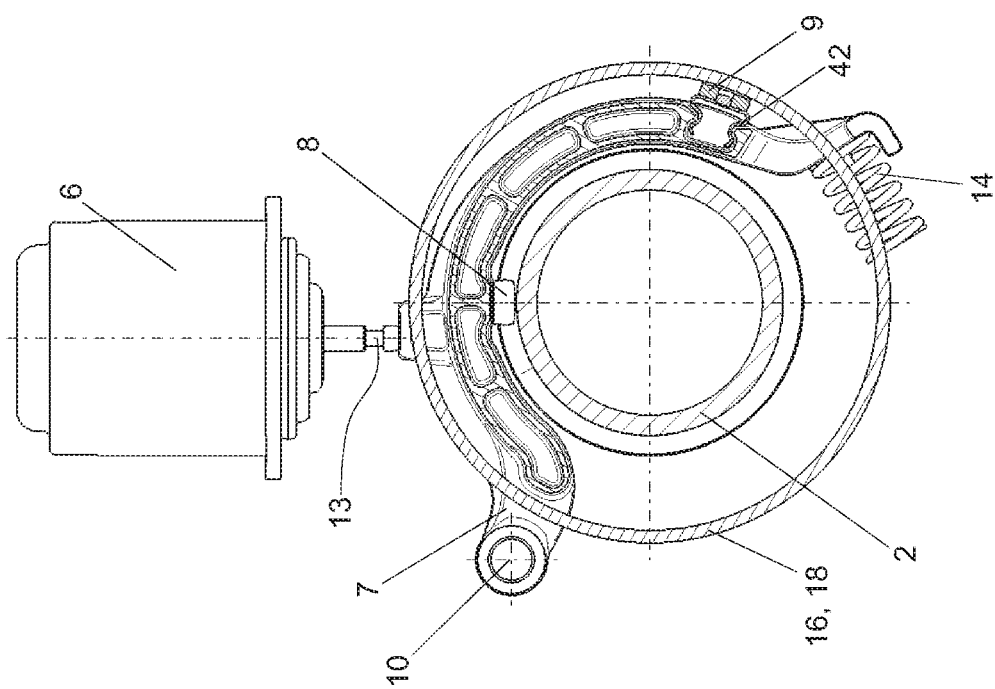
FIG. 26 shows a sectional view of the main components of a clutch arrangement in a second switching position along an intersecting plane A-A according to FIG. 18.

The second holding element 18 is illustrated in FIG. 11. The second holding element 18 is of annular design and is arranged on the outer lateral surface of the switching element 2 in a manner fixed axially and mounted rotatably. The second holding element 18 has a holding geometry 20 in the form of an end-side collar. The holding geometry 20 is formed on the inner circumference of the second holding element 18. Furthermore, an internal cone 21 is formed on the inner circumferential surface of the second holding element 18. The inner circumferential surface of the second holding element 18 is therefore partially formed by the holding geometry 20 and partially by the internal cone 21. The holding geometry 20 of the second holding element 18 is composed of a toothing region 22 running on the inner circumference and a web 23 running on the inner circumference.

One or more first holding elements 17 with third elastic elements 19 in the form of sheet-metal spring elements are guided radially outwards via passage openings 43 recessed in the switching element 2 and are brought into engagement with the holding geometry 20 of the second holding element 18 or are pressed radially inwards over the toothing region 22, which is arranged on the inner circumferential surface of the second holding element 18, when the second holding element 18 rotates. A locking function and, by rotation of the second holding element 18 relative to the switching element 2, an unlocking function of the switching element 2 can therefore be provided.

The first switching operation, namely the transition of the switching element 2 from the first switching position into the second switching position, takes place by means of a state change of the actuator 6 (FIG. 16 to FIG. 22). The energy for the axial movement of the switching element 2 from the first switching position into the second switching position is provided via the rotating output element 5.

FIG. 12 to FIG. 15 show the switching element 2 in a first switching position. By energizing of the coil of the actuator 6, the pin 13 of the actuator 6 is moved from a first (retracted) end position into a second (extended) end position. The actuating force is transmitted to the running roller 8 counter to the action of force of a first elastic element 14 by means of the actuating element 7 which is pivotable about the rotational axis 10. By rotation of the switching element 2 about the central rotational axis 11 of the output element 5, the running roller 8 comes into engagement with the control geometry 3 of the switching element 2 (FIG. 9a to FIG. 9c). By means of a corresponding configuration of the axially effective control geometry 3 (FIG. 6 to FIG. 9c), the switching element 2 undergoes an axial lifting movement upon rotation about the central rotational axis 11.

During the first switching operation, a second elastic element 15 is tensioned and, at the end of the first switching operation, the switching element 2 is locked in a positively locking manner in the second switching position via the third elastic elements 19 of the first holding elements 17. The action of force of the actuator 6 fixes the end position of the actuating element 7 counter to the acting spring force of the pretensioned first elastic element 14 at the end of the first switching operation (FIG. 23 to FIG. 26).

The second switching operation, namely the transition of the switching element 2 from the second switching position into the first switching position, takes place via a new state change of the actuator 6. In this case, the pin 13 of the actuator 6 is moved via the actuating element 7 from the second (extended) end position into a first (retracted) end position by means of the energy stored in the first elastic element 14. This takes place, depending on the design of the actuator 6, by energizing or by deenergizing or by opposing-current energizing of the coil of the actuator 6. As a result, the braking element 9 arranged on the actuating element 7 via the fastening element 42 is brought into engagement with the internal cone 21 formed on a second holding element 18. This brings about a rotation of the second holding element 18 relative to the switching element 2, as a result of which the third elastic elements 19 of the first holding elements 17 are pressed radially inwards by means of the tooth flanks of the toothing region 22 formed on the second holding element 18, and the unlocking operation is initiated. The movement of the switching element 2 from the second into the first switching position takes place by means of the energy stored in the second elastic element 15. At the end of the second switching operation, the first elastic element 14, the second elastic element 15 and the third elastic elements 19 are in a relaxed end position.

FIG. 9a, FIG. 9b and FIG. 9c show the position of the running roller 8 and control geometry 3 in different lifting and rotational angle positions of the switching element 2. In the first switching position (FIG. 9a), a radial play 24 is provided between the end surface of a running-roller bearing bolt 25 and the outer lateral surface 26 of the switching element 2. During the first switching operation (FIG. 9b), the running roller 8 is brought into engagement with the control geometry 3 of the switching element 2. The maximally possible pivoting movement of the actuating element 7 about the rotational axis 10 is restricted via that end surface of the running-roller bearing bolt 25 which is located radially on the inside with respect to the central rotational axis 11 of the output element 5, and the running roller 8 can roll or slide along the control geometry 3. At the end of the first switching operation (FIG. 9c), namely in the second switching position of the switching element 2, the running-roller bearing bolt 25 can pivot further radially inwards in the direction of the central rotational axis 11 of the drive element 4 by means of the undercut 12, which is locally incorporated in the control geometry 3, until the actuating element 7 has taken up its end position, which is preferably restricted via a stop fixed on the housing. The running roller 8 thus reaches an end position in which an all-round clearance of the running roller 8 and control geometry 3 becomes possible (radial play 24, axial play 27). Contact between the running roller 8 and control geometry 3 only takes place briefly during the first switching operation, and permanent frictional losses can be avoided both in the first switching position and in the second switching position of the switching element 2. In the first switching position and in the second switching position, there is radial play 24 between the bearing bolt 25 and the first radial portion 44 or the third radial portion 46, and therefore a clearance is ensured between the bearing bolt 25 and the first radial portion 44 and the second radial portion 46.

FIG. 27 shows an exemplary motor vehicle architecture with an internal combustion engine 28 arranged longitudinally with respect to the direction of travel, said motor vehicle architecture, apart from the internal combustion engine 28, comprising a main gear 29, a distribution gear 30, a front axle gear 31, a rear axle gear 32 and front side shafts 33 and rear side shafts 34 as essential power-transmitting components. In the all-wheel mode, also referred to as "4WD" mode, a requirement-appropriate distribution of the driving torque to the front side shafts 33 and the rear side shafts 34 takes place via the distribution gear 30. The terminology "4WD" stands for four-wheel drive and describes a motor vehicle drive via at least two motor vehicle axles, a front axle 35 and a rear axle 36 in the example shown in FIG. 27.

In the "2WD" mode, here the drive via a rear axle 36, the transmission of power by the distribution gear 30 takes place entirely to the rear wheels of the motor vehicle via the rear cardan shaft 37. In this operating state, the disconnect unit 38, which is designed as a coupling element, permits an entire shutdown of the angular drive in the front axle gear 31 and the front cardan shaft 39—with the aid of the clutch arrangement 1 according to the invention, as a result of which an economical "2WD" mode is ensured by reduction of unnecessary drag losses. The terminology "2WD" stands for two-wheel drive and describes a motor vehicle drive via just one motor vehicle axle, the rear axle 36 or the front axle 35 in the example shown in FIG. 27.

The disconnect unit 38 and therefore the clutch arrangement 1 according to the invention are controlled by a control unit (not illustrated) via an electric control line 40.

LIST OF REFERENCE SIGNS

1 Clutch arrangement
2 Switching element
3 Control geometry
4 Drive element
5 Output element
6 Actuator
7 Actuating element
8 Running roller
9 Braking element
10 Rotational axis
11 Central rotational axis (of the output element)
12 Undercut
13 Pin
14 First elastic element
15 Second elastic element
16 Holding mechanism
17 First holding element
18 Second holding element
19 Third elastic element
20 Holding geometry
21 Internal cone
22 Toothing region
23 Web
24 Radial play
25 Bearing bolt (of the running roller)
26 Outer lateral surface
27 Axial play
28 Internal combustion engine
29 Main gear
30 Distribution gear
31 Front axle gear
32 Rear axle gear
33 Front side shaft
34 Rear side shaft
35 Front axle
36 Rear axle
37 Rear cardan shaft
38 Disconnect unit
39 Front cardan shaft
40 Electric control line
41 Carry-along toothing
42 Fastening element
43 Passage opening
44 First radial portion
45 Second radial portion
46 Third radial portion

What is claimed is:

1. Clutch arrangement for a drive train of a motor vehicle comprising:
a switching element with a control geometry, the switching element being arranged on an output element such that it is fixed in terms of rotation but can be moved axially, namely can be moved selectively into a first switching position and into a second switching position, the output element being drive-connected to a drive element in the first switching position of the switching element, and the output element not being drive-connected to the drive element in the second switching position of the switching element;
an actuator, the movement of the switching element from the first switching position into the second switching position and/or vice versa to be actuated via the actuator;
an actuating element, via which the actuator actuates the movement of the switching element from the first switching position into the second switching position and/or vice versa; and
a running roller which is arranged on the actuating element,
wherein the actuating element is actuated via the actuator in the first switching position of the switching element in such a way that the running roller can be brought into engagement with the control geometry of the switching element, with the result that the switching element can be transferred from the first switching position into the second switching position, wherein the actuating element has a crescent-shaped configuration.

2. The clutch arrangement according to claim 1, further comprising a holding mechanism which locks the switching element mechanically in the first switching position and in the second switching position.

3. The clutch arrangement according to claim 2, wherein the holding mechanism has a braking element which is arranged on the actuating element and which, upon the actuation of a movement of the switching element from the second switching position into the first switching position, acts on the holding mechanism in such a way that the mechanical locking of the switching element in the second switching position is released and thus the movement of the switching element from the second switching position into the first switching position is initiated.

4. The clutch arrangement according to claim 3, wherein the braking element acts on the holding mechanism in a frictionally locking or positively locking manner.

5. The clutch arrangement according to one of claim 1, wherein the actuating element can be pivoted about a rotational axis which runs parallel to a central rotational axis of the output element.

6. The clutch arrangement according to claim 1, wherein the actuation of the actuating element takes place via the actuator in an electromechanical, electrohydraulic or electromagnetic manner.

7. The clutch arrangement according to claim 1, wherein the control geometry of the switching element has at least one undercut, with a result that, in the first switching position of the switching element and/or in the second switching position of the switching element, the running roller is situated in an all-round clearance with respect to the control geometry.

* * * * *